(No Model.) 10 Sheets—Sheet 1.
A. MOONELIS.
CIGARETTE MACHINE.
No. 514,240. Patented Feb. 6, 1894.
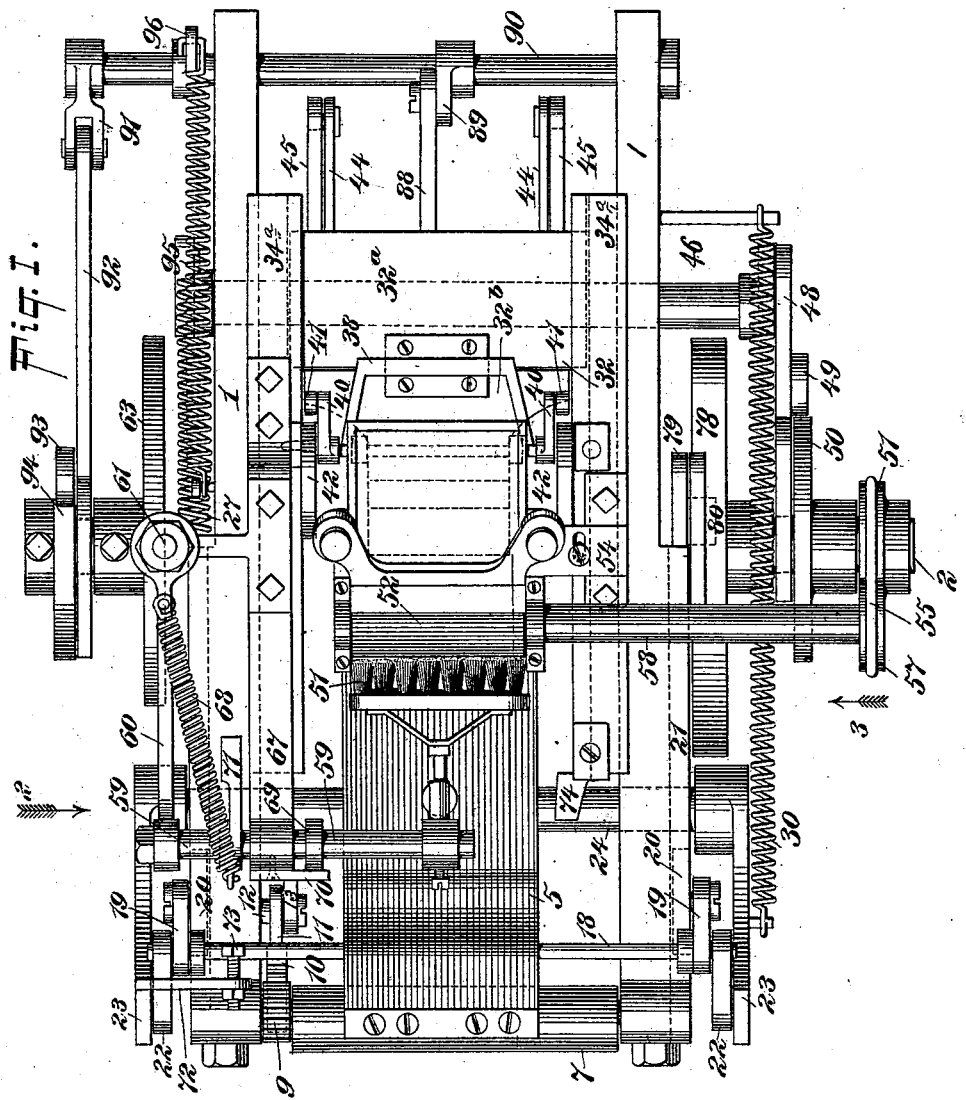
Fig. I.
WITNESSES:
William Goebel.
M. V. Bidgood
INVENTOR
Adolph Moonelis
BY
Knight Bros
ATTORNEYS.

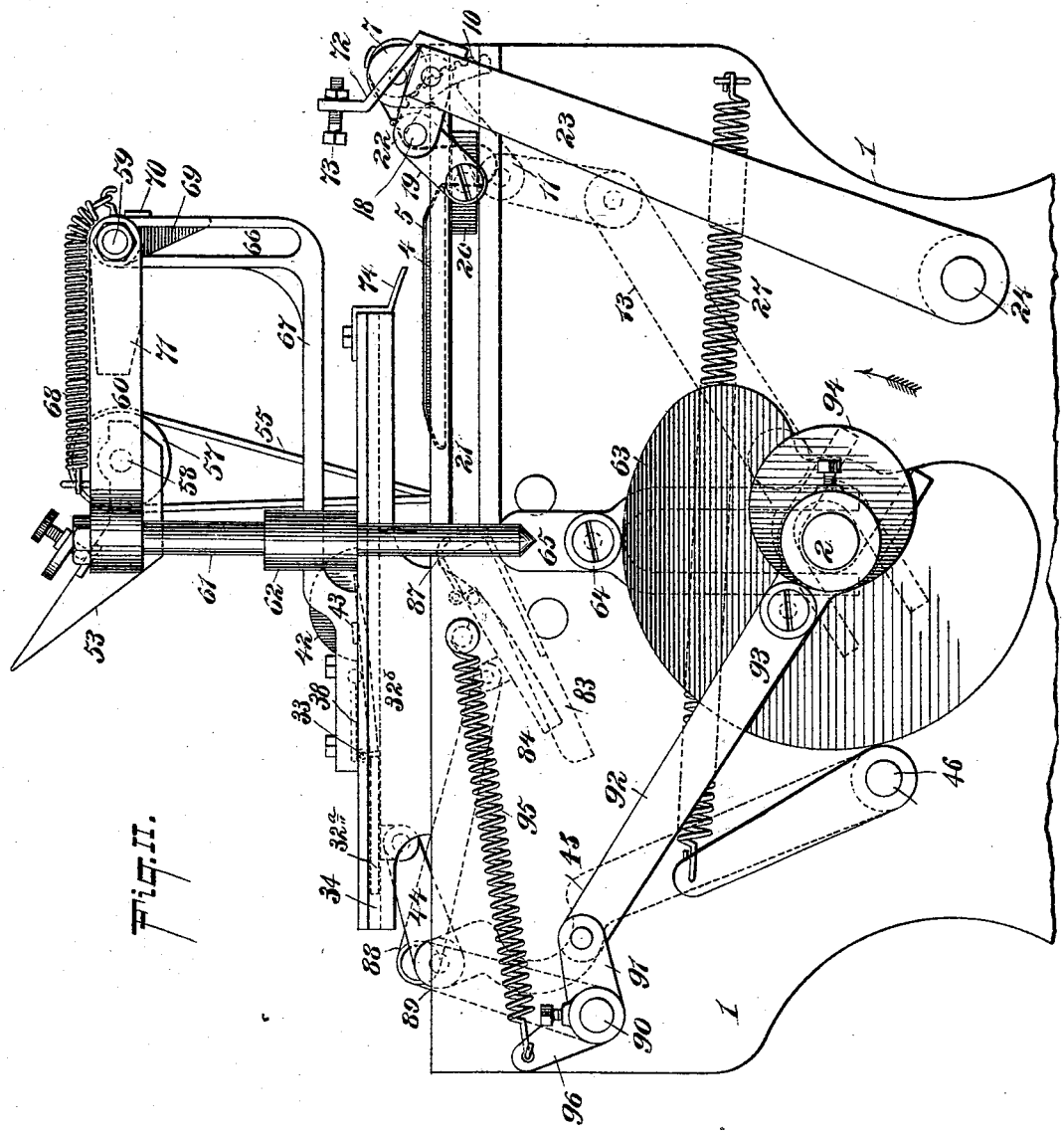

(No Model.)
10 Sheets—Sheet 3.
A. MOONELIS.
CIGARETTE MACHINE.
No. 514,240.
Patented Feb. 6, 1894.
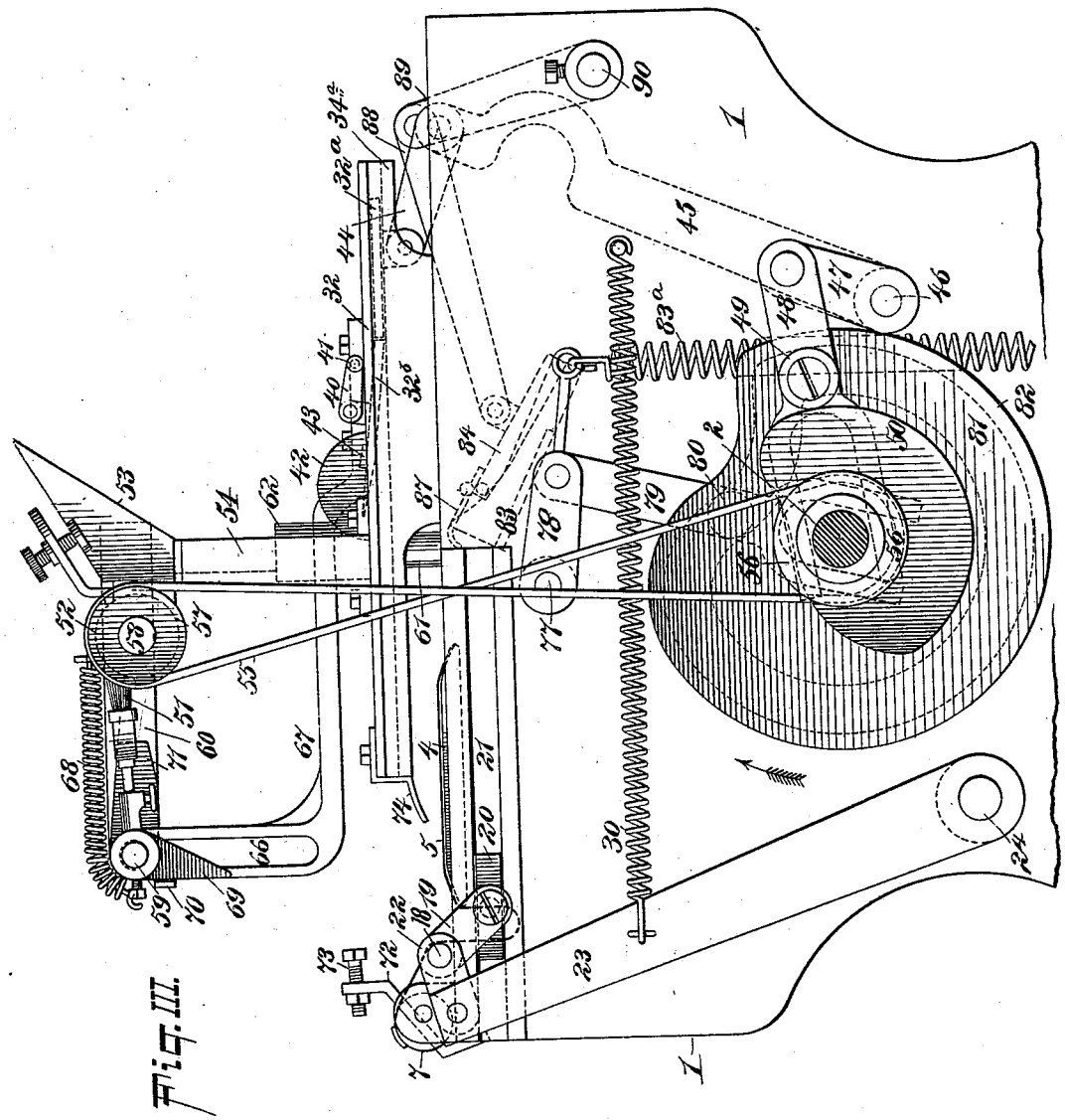
Fig. III.
WITNESSES:
William Goebel
M. E. Bidgood
INVENTOR
Adolph Moonelis
BY Hughes Bros
ATTORNEYS.

(No Model.) 10 Sheets—Sheet 4.
A. MOONELIS.
CIGARETTE MACHINE.
No. 514,240. Patented Feb. 6, 1894.
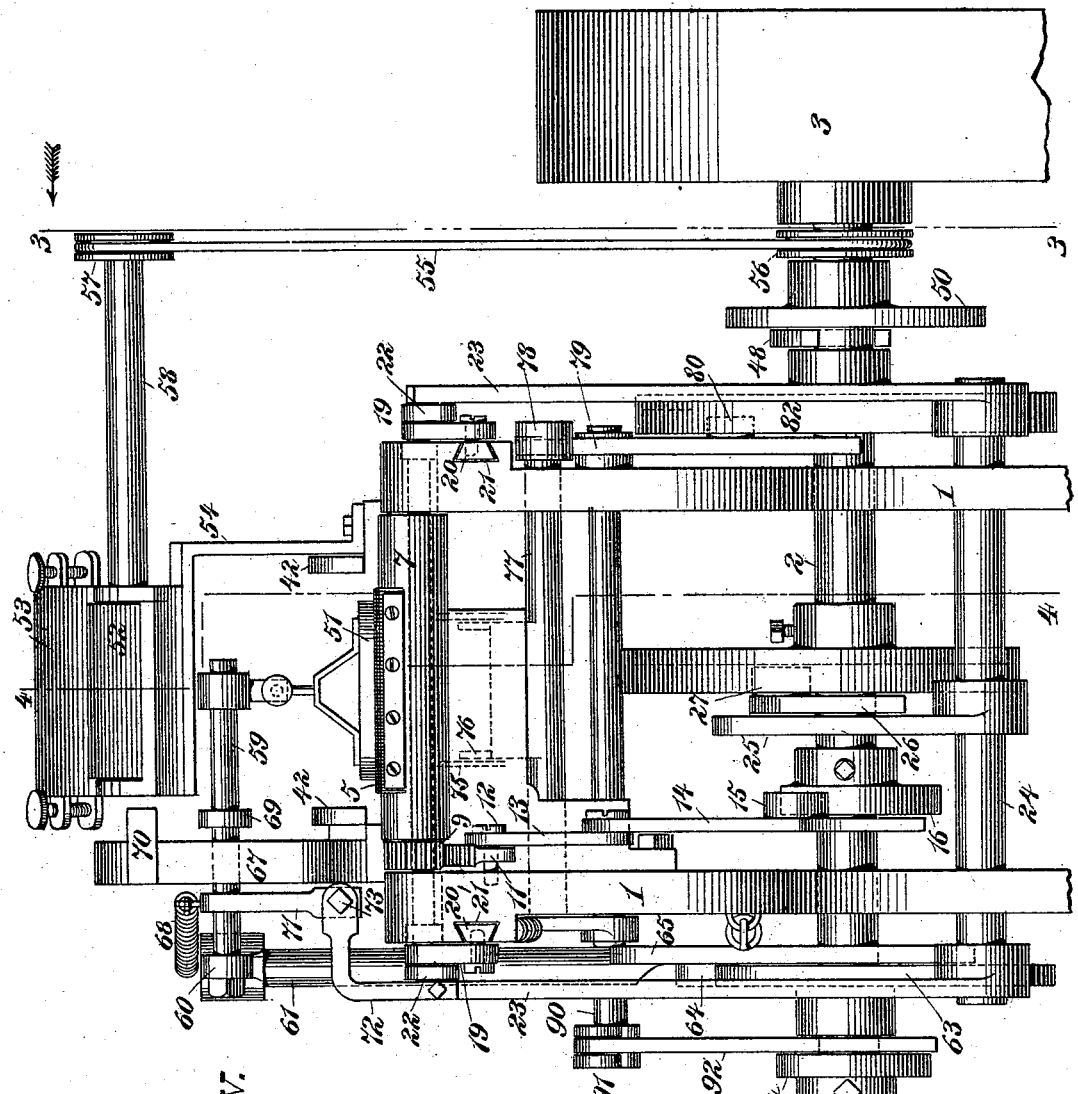
Fig. IV.
WITNESSES:
William Goebel.
M. V. Bidgood
INVENTOR
Adolph Moonelis
BY
ATTORNEYS.

(No Model.) 10 Sheets—Sheet 5.
A. MOONELIS.
CIGARETTE MACHINE.
No. 514,240. Patented Feb. 6, 1894.
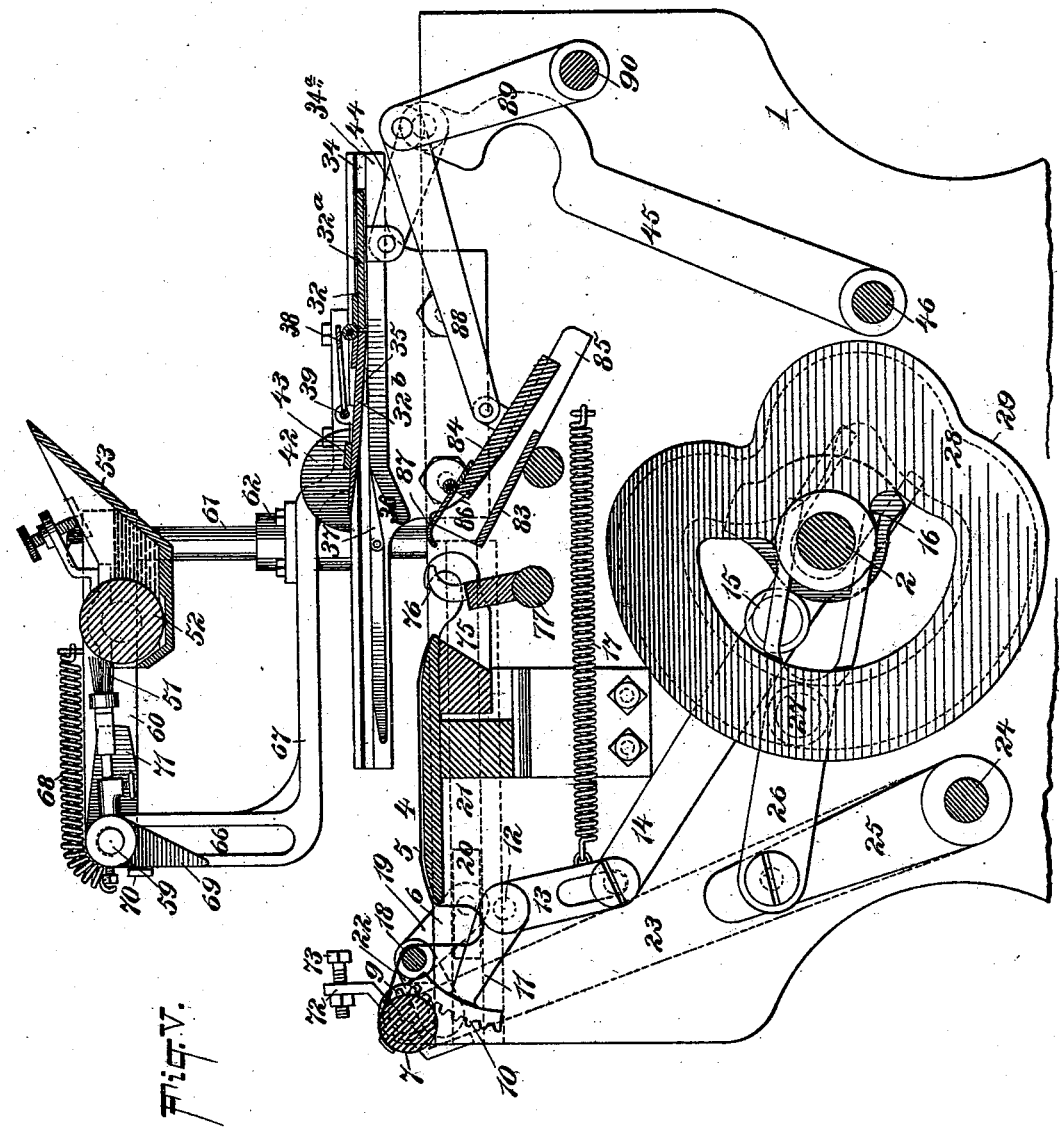
Fig. V.
WITNESSES:
William Goebel.
M. V. Bidgood
INVENTOR
Adolph Moonelis
BY Knight Bros
ATTORNEYS.

(No Model.) 10 Sheets—Sheet 6.
A. MOONELIS.
CIGARETTE MACHINE.
No. 514,240. Patented Feb. 6, 1894.
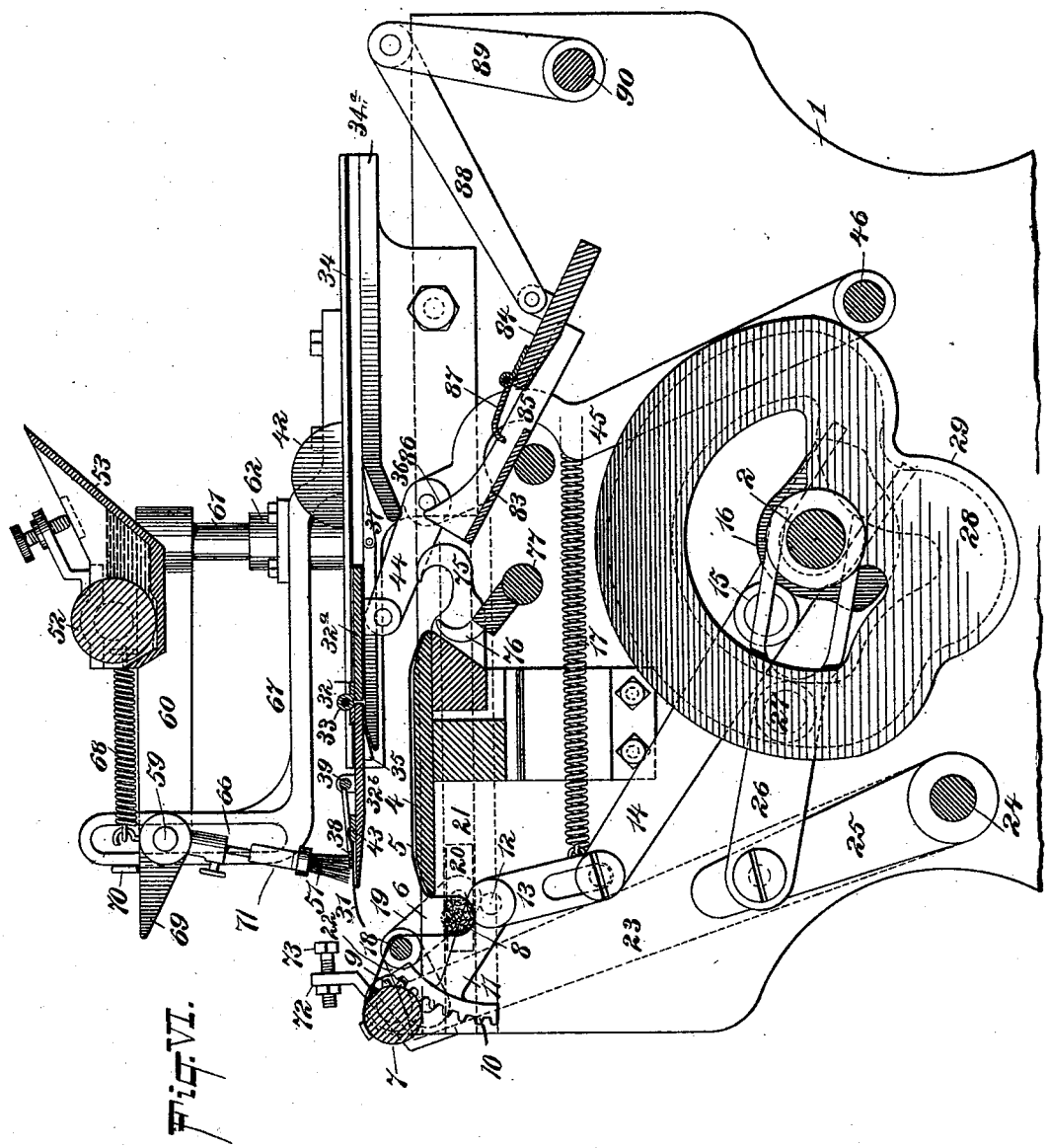
Fig. VI.
WITNESSES:
William Goebel
M. V. Bidgood
INVENTOR
Adolph Moonelis
BY Knight Bros
ATTORNEYS.

(No Model.) 10 Sheets—Sheet 7.
A. MOONELIS.
CIGARETTE MACHINE.
No. 514,240. Patented Feb. 6, 1894.
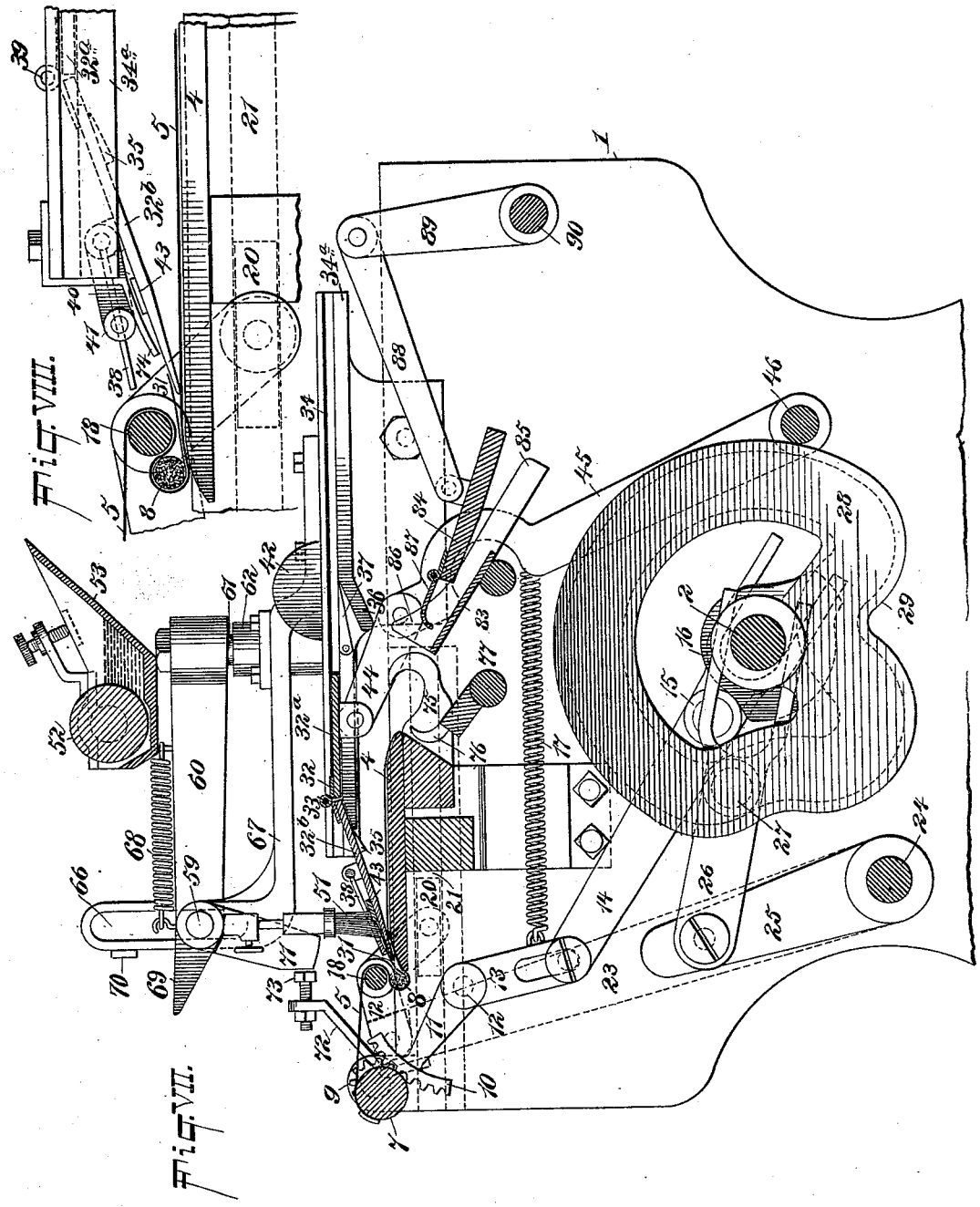
WITNESSES:
William Goebel.
M. V. Bidgood
INVENTOR
Adolph Moonelis
BY
Knight Bros
ATTORNEYS.

(No Model.)  10 Sheets—Sheet 8.
A. MOONELIS.
CIGARETTE MACHINE.
No. 514,240. Patented Feb. 6, 1894.
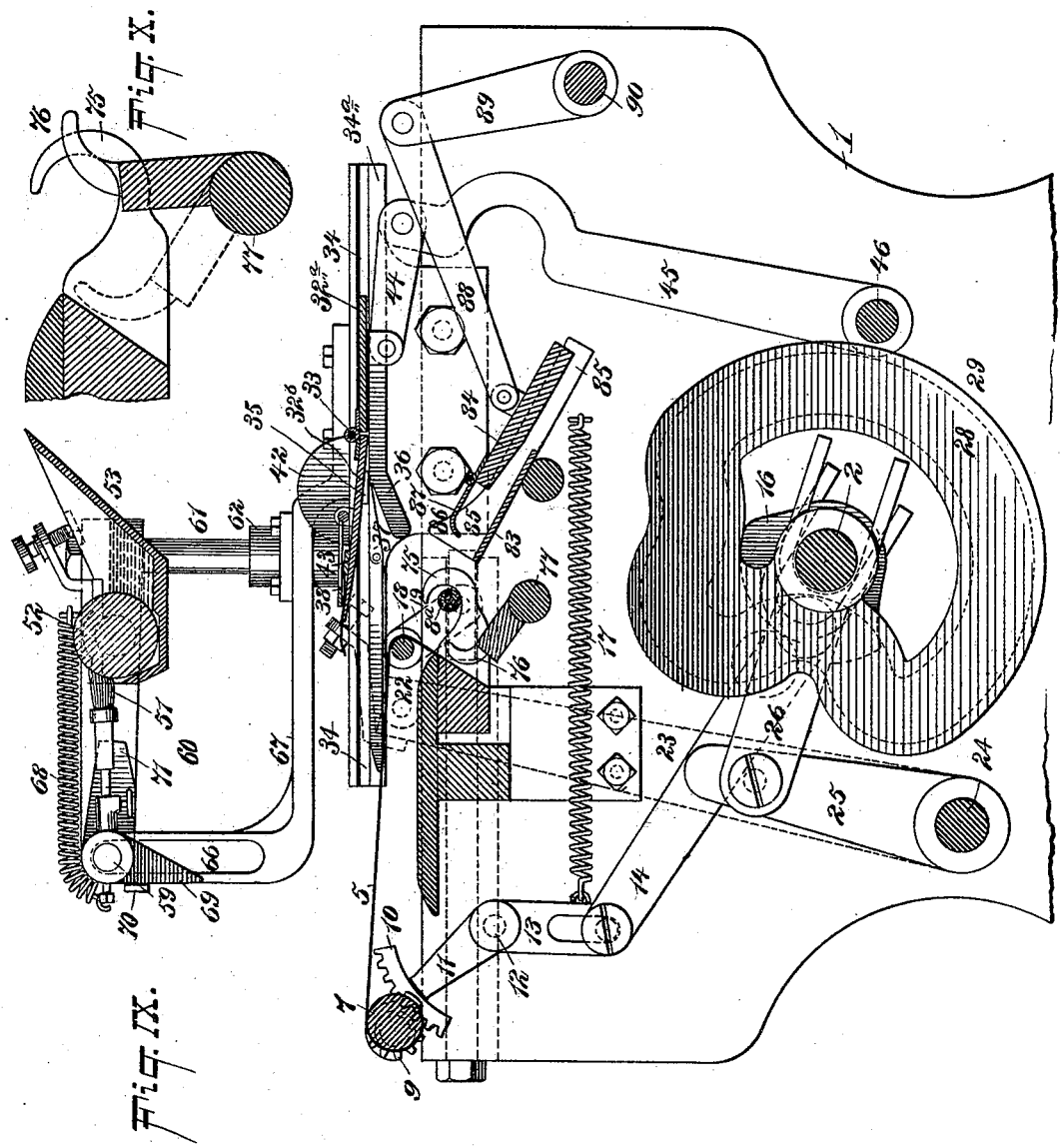
WITNESSES:
William Goebel
M. V. Bidgood
INVENTOR
Adolph Moonelis
BY Knight Bros
ATTORNEYS.

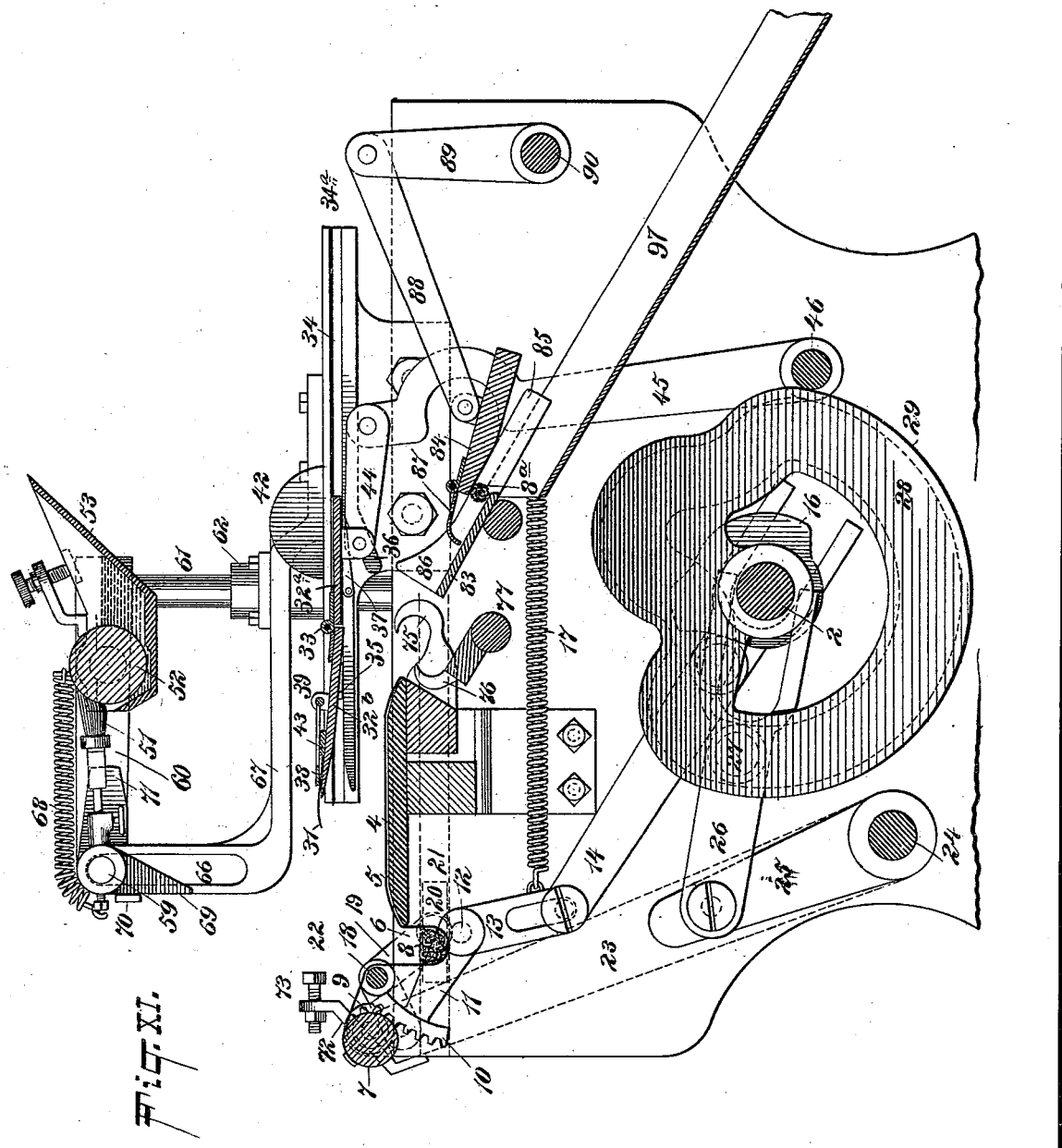

(No Model.) 10 Sheets—Sheet 10.
A. MOONELIS.
CIGARETTE MACHINE.
No. 514,240. Patented Feb. 6, 1894.
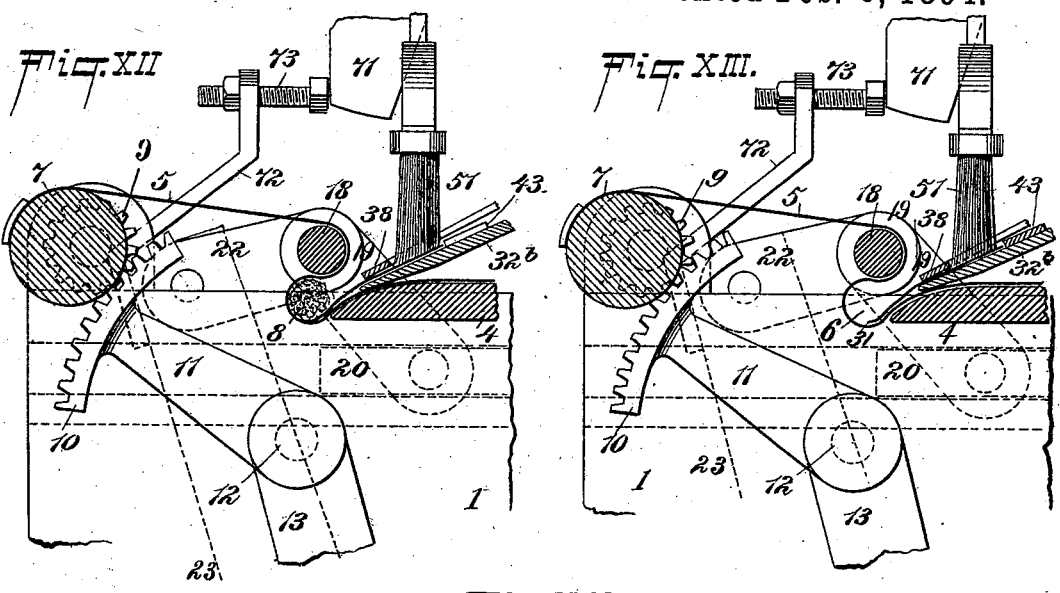
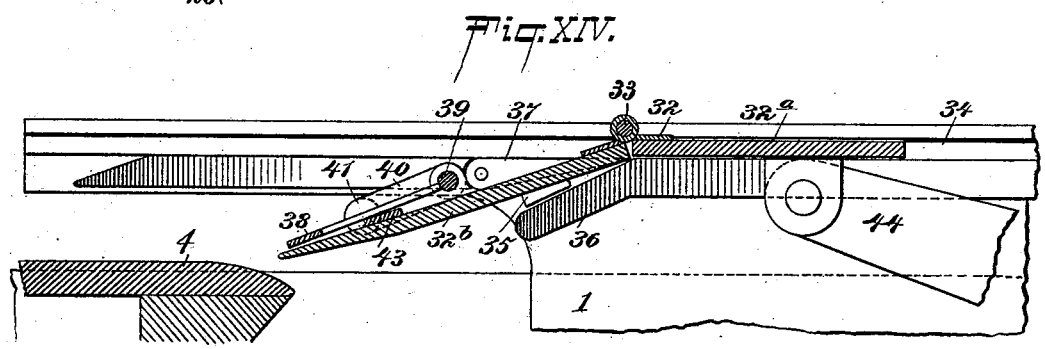
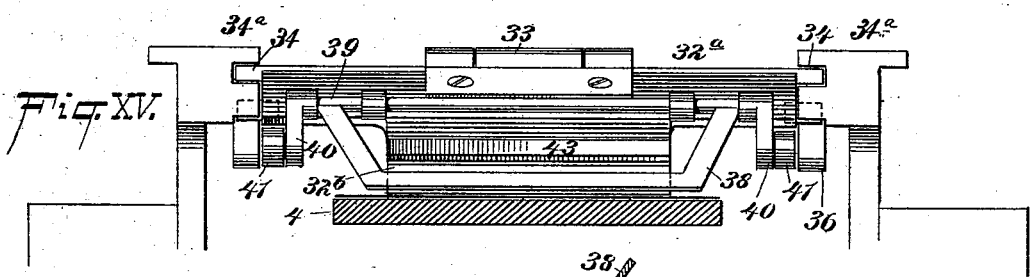
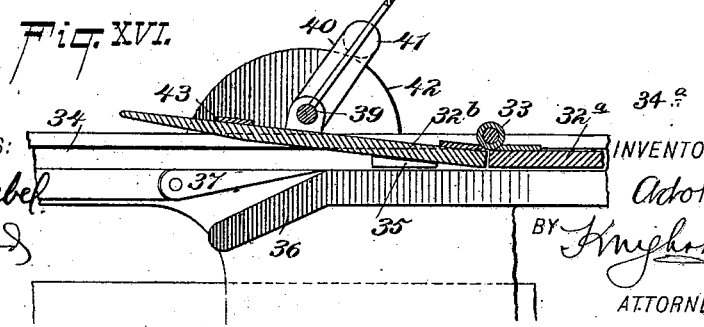
WITNESSES:
William Goebel
M. V. Bidgood
INVENTOR
Adolph Moonelis
BY Knight Bros
ATTORNEYS.
THE NATIONAL LITHOGRAPHING COMPANY,
WASHINGTON, D. C.

UNITED STATES PATENT OFFICE.

ADOLPH MOONELIS, OF NEW YORK, N. Y., ASSIGNOR TO THE INTERNATIONAL CIGARETTE MACHINERY COMPANY, OF SAME PLACE.

CIGARETTE-MACHINE.

SPECIFICATION forming part of Letters Patent No. 514,240, dated February 6, 1894.

Application filed April 10, 1893. Serial No. 469,848. (No model.)

*To all whom it may concern:*

Be it known that I, ADOLPH MOONELIS, a citizen of the United States, residing in the city, county, and State of New York, have invented certain new and useful Improvements in Cigarette-Machines, of which the following is a specification.

The invention relates more particularly to a machine for making all tobacco cigarettes, that is to say, cigarettes whose wrappers are made of tobacco leaf, cut from said leaf and fed separately and independently into the machine, the wrapper rolled upon a filler by an apron or belt, the edge of the wrapper pasted before it is finally rolled upon the filler, the ends of the cigarette being trimmed by suitable cutters, and the cigarette delivered from the machine completely finished, all by consecutive steps in the passage of the tobacco through the machine.

The object of the invention is to simplify and improve the mechanism of such class of cigarette machines so that the parts will co-act uniformly together and a minimum amount of personal labor will be required in the production of completed cigarettes.

The invention consists in the novel details of improvement and the combinations of parts that will be more fully hereinafter set forth and the novel features of which will be pointed out in the claims.

Referring to the accompanying drawings which form a part of this specification: Figure I is a plan view of a cigarette machine embodying my invention. Fig. II is a side elevation of the upper portion of the same looking in the direction of the arrow 2 in Fig. I. Fig. III is a sectional view on the line III—III in Fig. IV looking in the direction of the arrow 3 in Fig. I, showing the side of the machine opposite that in Fig. II. Fig. IV is an end view of the upper portion of the machine looking from the left in Fig. I. Fig. V is a vertical longitudinal section on the plane of the line IV—IV in Fig. IV showing the parts in their normal positions. Fig. VI is a similar view to Fig. V showing the cigarette filler on the apron or belt, the wrapper carried forward in position to receive paste and other parts in corresponding positions ready to act upon the filler. Fig. VII is a corresponding view showing the filler partly rolled, the wrapper in position to receive the filler and the paste brush in position to apply paste to the wrapper. Fig. VIII is a detail view, partly broken, of the rolling devices shown in the positions they assume when the wrapper is about to be rolled upon the filler. Fig. IX is a view corresponding to Fig. V showing the wrapper applied to the filler, the cigarette being in position upon the knives or cutters to have its ends trimmed. Fig. X is a detail view showing the positions of the knives in trimming the ends of the cigarettes. Fig. XI is a view corresponding to Fig. V showing a filler in position in the cavity in the apron or belt to form a new cigarette showing also a completed cigarette receiving the last rolling operation before it leaves the machine. Fig. XII is an enlarged detail sectional view showing the filler in the fold of the apron and just about to receive the wrapper, the paste brush being in position to apply the paste to the wrapper. Fig. XIII is a view similar to Fig. XII with the omission of the cigarette filler. Fig. XIV is an enlarged detail sectional view of the wrapper carrying devices and a portion of the rolling table. Fig. XV is a front view of the same looking from the left in Fig. XIV and Fig. XVI is a detail sectional view showing the wrapper carrier about to move forward to take the wrapper to the filler.

In the accompanying drawings, the numeral 1 indicates the frame of the machine which may be of any suitable construction and 2 is the main shaft of the machine hung in suitable bearings in the latter which shaft will be driven by suitable means, say, by a belt passing over pulley 3 on said shaft (see Fig. IV).

4 is a suitable rolling table upon which a suitable apron 5 is placed in which a cavity 6 is adapted to be formed to receive the loose tobacco for the filler. The opposite ends of the table 4 may be inclined downwardly as shown and the apron 5 secured at one end thereof by suitable means (see Fig. V). The opposite end of the apron 5 is preferably adjustably supported being shown attached to a shaft or roller 7 hung in suitable bearings on the frame 1.

The roller 7 is preferably hung eccentrically and provided with means for turning it so as to take up slack in the apron 5 to thereupon partially roll the cigarette filler 8 as hereinafter specified. By having an eccentric roller 7 the slack in the apron will be taken up quickly to partly roll the wrapper upon the filler. I have shown the roller 7 as provided with a gear 9 that is adapted to mesh with a toothed rack 10 carried by an arm 11 hung on a pivot 12 carried by frame 1. The arm 11 or its pivot 12 is firmly connected with an arm or lever 13 to which is pivotally connected a rod or bar 14 which at its lower end is forked to straddle the shaft 2 and carries a roller 15 to be acted upon by a cam 16 on said shaft for the purpose of moving rod 14 longitudinally. A spring 17 connected with frame 1 and with the lever 13 or other part with which it operates acts in opposition to the cam 16 in giving proper motion to rod 14 and the rack 10. With this construction, as the rack 10 oscillates the roller 7 it will be turned to draw upon apron 5 to partially roll the cigarette filler and when turned in the opposite direction provides slack by which the cavity 6 in the apron can be formed.

18 is a bunching roller or bar extending across the apron 5 and adapted to be moved forward to roll the cigarette filler in the cavity 6 of the apron. The bunching roller 18 is shown connected at opposite ends with arms 19 that are pivoted to slides 20 carried in suitable guides or ways 21 in frame 1 to permit them to slide longitudinally of said frame 1. The bunching roller 18 is also connected by links 22 with levers 23 that are attached to shaft 24 journaled in suitable bearings in the frame 1 the links 22 being pivoted on the levers 23. Upon the shaft 24 is secured an arm 25 by which said shaft is rocked to swing arms 23 for the purpose of moving bunching roller 18 over table 4 for rolling the cigarette filler thereupon. When the levers 23 are brought forward the links 22, acting through the links 19, cause the slides 20 to advance, whereupon the bunching roller 18 will be caused to descend to close the cavity in the apron. The arm 25 is shown pivotally connected with a rod 26 (see Fig. VI) whose forked end is shown straddling shaft 2, a roller 27 carried by arm 26 engaging in a groove 28 of a cam 29 on shaft 2 whereby the rod 26 in conjunction with a spring 30 connecting a lever 23 with a suitable part of the frame 1 acts to move levers 23 and thereby the bunching roller 18 to and fro.

In Fig. VI, the bunching roller or bar 18 and its connecting parts are shown in the normal positions a filler 8 being placed in the cavity 6 of the apron 5. When the levers 23 are first moved to the right in Fig. VI the bunching roller 18 is brought toward the forward end of table 4 whereby the slides 20 are pushed along their grooves 21 so that the mouth of the pocket 6 can be partially closed upon the filler 9 as in Fig. VII, whereupon a wrapper 31 is placed into the cavity 6 to be engaged by the filler as indicated in Fig. VII so that the wrapper can be rolled upon the filler.

The wrapper 31 is delivered to the cavity 6 by means of a reciprocating wrapper carrier 32. The wrapper carrier 32 is made in two parts, $32^a$, $32^b$ hinged together at 33 whereby the part $32^b$ can descend to deliver the wrapper to the filler (see Fig. VII). The wrapper carrier 32 is supported in guides $34^a$ carried by the frame 1 so that it may have a to and fro motion, the part $32^a$ being wider than the part $32^b$ and entering the grooves 34 whereby the part $32^b$ of the wrapper carrier is permitted vertical movement upon its hinge 33. The part $32^b$ carries on its under side a projection 35 adapted to ride upon inclined ways or guides 36 when the wrapper carrier is drawn away from proximity to the cavity 6 in the apron so as to lift said part $32^b$ to carry it upon a line with part $32^a$ as in Fig. XVI. The ways 36 lead to the groove 34 at which point a switch 37 is located and adapted to be raised by the part $32^b$ of the wrapper carrier to permit the projection 35 to enter the groove 34, said switch 37 constituting a movable lower portion to the groove 34 to permit the wrapper carrier to pass forward properly through said groove when the parts are in the position shown in Fig. XVI. The passage of the projection 35 beneath the switch 37 to enable it to enter groove 34 is indicated in Fig. XIV.

Upon the portion $32^b$ of the wrapper carrier is located an oscillating wrapper holder 38 adapted to be automatically moved from the position shown in Figs. I, II and V to the position shown in Figs. VI, VII, IX, XII, XIV and XV to hold the wrapper upon the portion $32^b$ of wrapper carrier 32. For the purpose of turning the wrapper holder 38 into the several positions mentioned, I have secured to its pivot or shaft 39 the crank arm 40 having roller 41 adapted to bear upon a semicircular incline or other suitably shaped ridge or projection 42 carried by frame 1 whereby as the wrapper carrier 32 is moved forward toward the cavity 6 of the apron, the wrapper holder 38 will be lifted and swung over forward to rest upon the wrapper as in Fig. VII, and when the wrapper carrier moves in the opposite direction the wrapper holder 38 will be lifted and moved back into the position shown in Fig. V to enable another leaf to be placed in position upon the forward portion of part $32^b$ of the wrapper carrier 32. By this means, the wrapper is securely held upon the wrapper carrier as it is moved forward to receive the filler.

In Fig. XVI I show at $42^a$ the ridge or projection slightly modified in shape but this is a mere difference in construction the principle and mode of operation being the same.

In the operation of this machine the wrapper carrier is moved to and fro with considerable speed and the shock of the roller 41 as it collides with projection 42 causes the sudden lifting of the wrapper holder 38 and this action and the resulting momentum causes the wrapper holder to be thrown over into its other and extreme position. The same action takes place upon the return movement of the carrier thus reversing the wrapper holder and returning it to its normal position.

43 is a suitable guide upon the portion $32^b$ of the wrapper carrier 32 whereby the operator can be enabled to properly place the wrapper in position thereupon. The wrapper carrier 32 is given a reciprocating motion along its guides 34 by suitable mechanism, in the drawings being shown pivotally connected by links 44 with levers 45 secured to a shaft 46 suitably journaled in the frame 1. The shaft 46 in Fig. III is shown provided with an arm 47 pivotally connected with an arm 48 having one end forked to straddle the shaft 2 and carrying a roller 49 that is acted upon by cam 50 on said shaft whereby suitable motion will be imparted to shaft 46 and through levers 45 and connected parts to the wrapper carrier 32.

The paste is applied to one side of the wrapper 31, while the parts are in the position shown in Figs. VII, XII and XIII and before it has been rolled upon the filler 8. To properly apply the paste, I have provided a suitable brush 51 that is normally in contact with a roller 52 located in and suitably journaled on a paste receptacle 53 carried by supports 54 extending from frame 1 (see Fig. IV). The roller 52 is rotated by a belt 55 passing over a pulley 56 on shaft 2 and over a pulley 57 on shaft 58 of roller 52 as shown. The brush 51 is suitably adjustably carried by a shaft 59, journaled on an arm 60 projecting from a vertically sliding guide rod or frame 61 carried in bearings 62 on frame 1. The rod 61 is moved up and down by a cam 63, on shaft 2, acting on a roller or the like 64 carried by an arm or extension 65, secured to rod 61, the lower end of said arm or extension 65 being forked or slotted to straddle shaft 2 to guide rod 61 as in Fig. II.

The shaft 59 is turned or oscillated as rod 61 moves up and down to carry the brush 51 from roller 52 to the wrapper beneath, and vice versa, to apply paste to said wrapper and for this purpose, I have shown shaft 59 passing through a vertical slot 66 in a suitable guide 67 carried by frame 1, whereby brush 51 can be brought to its proper positions.

68 is a spring connected with shaft 59 and arm 60 (or other suitable part) and adapted to turn shaft 59 when it is depressed, to carry brush 51 into position to apply paste to the wrapper (see Fig. VI). The shaft 59, carries an arm 69, shown at substantially right angles to brush 51 that engages a projection 70 on guide 67, so that when shaft 59 rises from the position shown in Fig. VI to that shown in Fig. III, the contact of arm 69 on projection 70 will turn said shaft to carry brush 51 into contact with paste roller 52. When shaft 59 descends arm 69 passes from projection 70 to enable spring 68 to turn shaft 59 into the position shown in Figs. VI, XII and XIII to apply paste to the wrapper.

71 is an arm connected with shaft 59 and extending substantially parallel to brush 51, and in position when the brush 51 is lowered, to be engaged by an arm 72, or an adjustable abutment 73 thereon (see Figs. XII and XIII) which arm 72 is connected with the lever 23 that actuates the roller 18. The arrangement is such that when brush 51 has been brought to bear on the wrapper and the roller 18 advances to roll the filler 8, the arm 72 will push arm 71, and thus pass brush 51 over the edge of the wrapper, whereby paste will be applied to the wrapper evenly, as by a wiping motion, the brush 51 then rising to the normal position (Fig. III) while the filler is rolled and wrapped. At about this time the wrapper carrier 32, recedes or moves to the right in Fig. VII and to relieve it from the pressure of holder 38, the roller 41, connected therewith engages an incline 74 shown connected with guides 34 (see Figs. I and VIII) and by riding up on the same lifts holder 38 from the wrapper so that the latter will not be dragged from beneath the filler.

After the filler has been rolled and wrapped its ends are to be cut off uniformly and for this purpose it is delivered from the rolling apron 5 to a pair of properly spaced stationary cutters 75, suitably carried by frame 1 (see Figs. IX and X). The cutters 75 are shown substantially hook shaped to receive in their concave recess the cigarette as it is delivered from the rolling apron, whereby it is supported by said cutters.

76 are quick acting oscillating cutters, arranged in pairs corresponding to cutters 75, located between and contiguous to said cutters, and coacting therewith. The cutters 76 are carried by a shaft 77, suitably journaled in frame 1. To shaft 77 is secured a crank arm 78, pivotally connected with a rod or crank 79, whose lower end is forked or slotted to straddle shaft 2, the rod 79 carrying a roller 80, that works in a suitable groove 81 in a cam 82 on shaft 2 (see Fig. III). Said groove 81 has a substantially right angled portion whereby the quick chopping movement of the knives 76 is obtained. A spring $83^a$ connected with crank 78 and with a suitable part of frame 1 acts with cam 82 in oscillating shaft 77. The arrangement of these parts and the acting contour of cam 82 is such as to give the knives 76 a quick movement forward to cut or trim the ends of the completed cigarette held by stationary cutters 75. This quick movement of cutters 76 not only trims the ends of the cigarette but carries the latter forward and deposits it upon an inclined chute or way 83 suitably supported by frame A in proximity to cutters 75 (see Figs. V and XI).

I desire to give the complete cigarette a final rolling after it is trimmed and for this purpose I provide a reciprocating rubber or rolling block 84 that fits in or upon the chute 83, and is adapted to bear upon the cigarette 8ᵃ therein (see Fig. XI). For the purpose of properly guiding the rubber 84 it rests upon the sides 85 of chute 83, the forward sides of said chute being cam-like or beveled upwardly and forwardly at 86 so as to tilt or oscillate the rubber 84 as it travels to and fro (see Figs. V, VII and IX). The rubber 84 carries at its forward end a pivoted collector or finger 87, adapted to drag the cigarette along chute 83 to straighten it relatively to the rubber 84 so that it will lie true under the latter. The rubber 84 is pivotally connected with an arm or lever 88 that is jointed to a crank 89 on a rock shaft 90 suitably journaled in frame 1. The shaft 90 also carries a crank arm 91 pivotally connected with a rod or link 92, that is forked or slotted at its forward end to straddle shaft 2 (see Fig. II). The rod 92 carries a roller 93 that bears on cam 94 carried by shaft 2 whereby proper motion is imparted to shaft 90. A spring 95 connected with frame 1 and with shaft 90, say, by an interposed crank arm 96 on the latter coacts with cam 94 to give proper complete motion to shaft 90. As the shaft 90 is rocked by cam 94 the rubber 84 will be moved up the inclined side 86 of chute 83 to receive the cigarette between said rubber and said chute, whereupon it will be finally rolled, and delivered from chute 83 into another chute 97 (see Fig. XI) from whence it will be conducted to a suitable receiver.

It will be understood that the several cams and connecting arms and levers can be modified from those shown to produce the various movements in the several parts at the desired times, and that the driving and actuating parts can be changed as may be found suitable without departing from the spirit of my invention.

It will be understood that the wrapper I intend to use in the machine is to be cut from a leaf of tobacco and may be suitably treated or worked to render it pliable and adapted to be rolled upon a filler within the cavity of an apron.

The operation is as follows:—The parts being in the position shown in Fig. V, a wrapper or leaf 31 is placed upon the part 32ᵇ of wrapper carrier 32, and a filler 8 in cavity 6 in apron 5. The machine being started the wrapper carrier 32 travels forward (or to the left in Fig. VI) whereupon the incline 42 acting on roller 41 and arm 40, causes the wrapper holder 38 to be brought over (see Fig. XVI) to rest upon the wrapper 31 (see Fig. VI). When the projection 35 on the wrapper carrier passes from the inclined part 36, the hinged portion 32ᵇ of the wrapper carrier will descend and pass the projecting edge of the wrapper 31 into the cavity 6 (see Figs. VII and XII). The bunching roller 18 now being moved to the right in Fig. VII, by the action of levers 23, pushes slides 20 along their grooves, and thus the roller or bar 18 is held near the end of the rolling table 4. The filler 8 now rests upon the part of the wrapper in the cavity 6 of the apron. The roller 7 is now turned to draw upon the apron 5, and take up the slack while at the same time the movement of the apron will partly roll the wrapper about the filler as in Figs. VII and VIII. When the wrapper 31 is brought to the cavity 6, the rod 61 descends to lower the paste brush 51. As the latter descends its arm 69 passes from abutment or projection 70, and permits the spring 68 to turn shaft 59 and thus carry the brush 51 to the vertical position, whereupon it will be brought against one side or edge of the wrapper 31 as in Fig. VII. As the bunching roller or bar 18 advances and reaches the proper position the part 73 will engage the arm 71 and by pushing the same will move the brush 51 along the wrapper, and thus apply paste to the latter by a wiping motion, this being permitted by the rotativeness of shaft 59. The brush 51 and connected parts will next rise and return to their normal positions. The wrapper carrier will now recede, and in doing so, the roller 41 will engage the extension 74 and thus lift the holder 38 from the wrapper 31 (see Fig. VIII) leaving the wrapper partly rolled around the filler 8, as shown. As the wrapper carrier continues to recede, its projection 35 engages the incline 36 and while riding up the same lifts the switch 37 to permit the part 32ᵇ of the wrapper carrier to return to the normal position. While the wrapper carrier is receding, as stated (or otherwise if desired) the bunching roller or bar 18 will move along the rolling table 4 and thus roll the filler 8 within the wrapper, and the previously applied paste on the latter will hold the wrapper in position. When the bunching roller 18 reaches the forward end of table 4, the slack in the apron will be fully taken up, whereupon the now complete cigarette will be deposited upon the stationary cutters 75, as in Fig. IX. The bunching roller 18 may now quickly return to the normal position to enable another filler to be placed in the cavity 6 of the apron, while the moving cutters 76 will be brought forward with a quick chopping motion to cut or trim the projecting ends of the cigarette, in conjunction with the stationary cutters 75 (see Fig. X). This sudden motion of the cutters 76 acts to cause the cigarette to pass to the chute 83. The rubber or rolling block 84 now receives the cigarette beneath it and begins to descend whereupon the finger 87 will act to straighten the cigarette in the chute. The rubber 84 now presses upon and rolls the cigarette to press out imperfections, &c., and to give it a satisfactory finish. The cigarette then passes to the chute 97 and is conducted away.

It is evident that the exact times of movement of the several parts of this machine can be varied from those mentioned above, the idea being to have the several parts so co-act that loss of time in the return movements of the parts will be avoided. Thus it occurs that while the bunching roller 18 is rolling the cigarette and returning, a wrapper 31 can be placed on the carrier 32, and the latter can then quickly begin to move.

Although I have shown a brush for applying paste, it is evident that any other suitable carrier adapted to transfer paste from the receptacle to the wrapper can be used, and when I use the word brush in this specification I mean to include any paste carrier.

I do not herein broadly claim a hinged wrapper carrier as that is claimed in my application for patent, Serial No. 440,631, filed July 20, 1892.

Having thus described my invention, the following is what I claim as new therein and desire to secure by Letters Patent:

1. In a cigarette machine, the combination of an apron adapted to have a pocket formed in it, and a rolling table with a roller or bar 7, hung eccentrically, said apron being secured to said roller, means for turning said roller to take up slack in the apron, and a bunching roller or bar 18 to close the cavity in the apron, substantially as described.

2. In a cigarette machine, the combination of an apron adapted to have a cavity formed in it, a rolling table to which the apron is connected at one end and over which it passes, a bunching roller or bar 18, slides 20, at the sides of said table, guides for said slides, arms 19 pivotally connected with said roller and slides, links 22, means for moving the bunching roller or bar 18 across the table, the links 22 being pivotally connected thereto and to the arms 19, a roller or bar to which one end of the apron is attached, and means for turning said roller, substantially as described.

3. In a cigarette machine, the combination of a rolling apron, an eccentrically hung roller 7 to which it is attached, gears connected with said roller, a segmental rack engaging said gears, a pivoted arm or lever carrying said rack, means for rocking said arm or lever, and a bunching roller or bar 18 to operate upon said apron, substantially as described.

4. The combination with a jointed wrapper carrier and means for moving the same to and fro, of a wrapper holder carried by the forward part of said wrapper-carrier and means for actuating said holder, and means for permitting the forward part to descend to a lower plane, substantially as described.

5. The combination with a rolling apron, of a wrapper carrier above the same and having a portion adapted to descend toward the apron, means for reciprocating said wrapper carrier, a wrapper holder carried by said descending portion, and means for operating said holder and for permitting said portion to descend, substantially as described.

6. The combination with a rolling apron, of a wrapper carrier above the same and having a portion adapted to descend toward the apron, and means for permitting said portion to descend, a wrapper holder carried by said portion, and an incline at one side of the wrapper carrier arranged to operate said holder, and devices intermediate of the incline and the holder and means for operating the carrier, substantially as described.

7. The combination with a rolling apron, of a wrapper carrier above the same and having a portion adapted to descend toward the apron, and means for permitting said portion to descend, a wrapper holder on said portion, a crank arm connected with said holder and means to actuate said crank arm and means for reciprocating the carrier, substantially as described.

8. The combination with a rolling apron of a wrapper carrier above it, a wrapper holder pivoted thereon, a crank arm connected with the latter, and an incline at one side of the wrapper carrier to operate said crank arm to swing said holder, substantially as described.

9. The combination of a rolling apron, a wrapper carrier above it and means for moving the latter to and fro, a wrapper holder pivoted on said wrapper carrier, a crank arm connected with said holder and inclines facing in opposite directions arranged to actuate said crank arm and move the wrapper holder in opposite directions, as the wrapper carrier travels to and fro, substantially as described.

10. The combination of a rolling apron with a wrapper carrier having a portion adapted to descend toward the latter, means for permitting said portion to descend a movable wrapper holder on said portion of said wrapper carrier, guides for the latter, means for moving said wrapper carrier to and fro, a crank arm connected with said holder, and an incline 74 in the path of said crank arm to raise the holder from the wrapper, as the carrier recedes, substantially as described.

11. A wrapper carrier having a pivoted portion adapted to descend, means for permitting the descent of said portion with guides for said carrier, a switch 37, in said guides and an incline 36 leading to said switch to guide the lowered portion of the carrier past said switch, substantially as described.

12. In a cigarette machine, the combination of a rolling apron, a rolling table having a pair of curved hook-like stationary cutters, a pair of curved moving cutters co-acting with said stationary cutters, shaft 77 carrying said cutters, crank arm 78 thereon, rod 79 having a roller thereon and cam 82 co-acting with said roller and having substantially a right angled portion for imparting a quick movement to said cutters, and spring 83$^a$ connected with said crank arm and with the stationary part of the machine, as described and shown.

13. In a cigarette machine, a paste receptacle combined with a paste brush or carrier, and means substantially as described for moving said brush from a horizontal position to a vertical position to apply paste to a wrapper, and means for moving the brush slightly sidewise while in the lower position to apply paste to the wrapper substantially as described.

14. In a cigarette machine, a paste receptacle, combined with a paste brush or carrier, a wrapper carrier below the same and means for moving the brush from a horizontal position above the wrapper carrier to a vertical position, over said carrier and means for moving the brush slightly sidewise while in the lower position to apply paste to the wrapper, substantially as described.

15. In a cigarette machine, a paste receptacle, combined with a paste brush or carrier, a horizontal rock shaft carrying the latter, means for raising and lowering said shaft, and means for turning the same, substantially as described.

16. In a cigarette machine, a paste receptacle combined with a paste brush or carrier, a horizontal rock shaft carrying the latter, means for raising and lowering said shaft, means for turning said shaft to carry the brush from the receptacle to a lower position, and means for moving said brush slightly sidewise while in the lower position to apply paste to a wrapper, substantially as described.

17. In a cigarette machine, a paste receptacle, combined with a paste brush or carrier normally extending horizontally, a paste distributing roller in said receptacle upon the side of which said brush can bear, and means for moving said brush from said distributing-roller into position to apply paste to a wrapper and means for moving the brush slightly sidewise while in the lower position to apply paste to the wrapper, substantially as described.

18. In a cigarette machine, a paste receptacle, combined with a paste brush or carrier, a rock shaft carrying the latter, an arm or projection connected to said shaft to rock it, an abutment to actuate said arm, and means for moving said shaft sidewise, substantially as described.

19. In a cigarette machine, a paste receptacle, combined with a paste brush or carrier, a rock shaft, a support therefor, means for vertically reciprocating said support, an arm or projection connected with said shaft, an abutment to be engaged by the projection, and a spring 68 connected with said shaft, substantially as described.

20. In a cigarette machine, the combination of a paste receptacle, a paste brush or carrier, a rock shaft therefor, an arm or support for said shaft, means for vertically reciprocating said support, a guide for said shaft, a projection or arm connected with the shaft, an abutment to be engaged by said projection or arm, and a spring connected with said shaft to turn it, substantially as described.

21. In a cigarette machine, the combination of a paste receptacle, a paste brush or carrier, means for moving said brush or carrier from the receptacle to a position to apply paste to a wrapper, a rolling apron, a bunching roller or bar 18 therefor, levers for operating said bar and means intermediate between said levers and said paste brush or carrier for moving the latter slightly sidewise, substantially as described.

22. In a cigarette machine, the combination of a paste receptacle, a paste brush or carrier, means for moving the latter from the receptacle to a position to apply paste to a wrapper, a rolling apron, a bunching roller or bar 18 therefor, levers for moving said bunching roller or bar, an abutment connected therewith, and an arm or projection connected with said brush to be engaged by said abutment, as and for the purposes set forth.

23. In a cigarette machine, the combination of a paste receptacle, a paste brush, means for moving the latter substantially as described, a rolling apron, a bunching roller, or bar 18 therefor, levers for moving said roller or bar and an adjustable abutment connected with said levers and an arm or projection connected with said brush to be engaged by said abutment, as and for the purposes specified.

24. In a cigarette machine, the combination with a rolling apron and rolling table, of a chute contiguous thereto to receive a cigarette from said apron, a cigarette rubber co-acting with said chute to roll a cigarette and means for actuating said rubber, substantially as described.

25. In a cigarette machine, the combination with a rolling apron and a rolling table, of a chute to receive a cigarette from the apron, a rubber co-acting with said chute to roll a cigarette, a finger or collector carried by said rubber to straighten a cigarette in the chute, and means for actuating said rubber, substantially as described.

26. In a cigarette machine, the combination of a rolling apron, and a rolling table with a chute contiguous thereto to receive a cigarette, a reciprocating rubber therein and means for reciprocating said rubber, substantially as described.

27. In a cigarette machine, the combination of a rolling apron, a rolling table, a chute, a rubber 84, an incline to raise and lower the rubber as it is moved along the chute and means for reciprocating said rubber, substantially as described.

28. In a cigarette machine, a rolling apron, and a rolling table combined with a chute, inclined sides on said chute, a rubber 84 over said chute and riding on said incline sides of said chute and means for reciprocating said rubber, substantially as described.

ADOLPH MOONELIS.

Witnesses:
HERBERT KNIGHT,
L. WOOLSEY.